US008095173B2

(12) United States Patent
Chapyzhenka et al.

(10) Patent No.: US 8,095,173 B2
(45) Date of Patent: Jan. 10, 2012

(54) WIRELESS COMMUNICATION DEVICE WITH PHYSICAL-LAYER RECONFIGURABLE PROCESSING ENGINES

(75) Inventors: Aliaksei Vladimirovich Chapyzhenka, St. Petersburg (RU); Mikhail Yurievich Lyakh, St. Petersburg (RU); Oleg Borisovich Semenov, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 993 days.

(21) Appl. No.: 12/064,199

(22) PCT Filed: Aug. 22, 2005

(86) PCT No.: PCT/RU2005/000429
§ 371 (c)(1),
(2), (4) Date: Feb. 19, 2008

(87) PCT Pub. No.: WO2007/024153
PCT Pub. Date: Mar. 1, 2007

(65) Prior Publication Data
US 2008/0186887 A1    Aug. 7, 2008

(51) Int. Cl.
*H04M 1/00* (2006.01)
(52) U.S. Cl. .................. 455/550.1; 455/418; 455/552.1; 375/262; 375/341; 714/794; 714/795
(58) Field of Classification Search ............... 455/127.4, 455/161.2, 164.2, 183.2, 234.2, 418–420, 455/424, 425, 550.1, 552.1, 553.1, 556.2, 455/561, 66.1, 73, 90.2, 130, 556.1; 370/203, 370/210, 310, 319, 320, 335, 338, 342, 204, 370/208, 328; 375/130, 135, 136, 140, 219, 375/220, 262, 295, 340, 341; 714/755, 756, 714/784, 794, 795, 824
See application file for complete search history.

(56) References Cited

U.S. PATENT DOCUMENTS

| 6,369,758 | B1 | 4/2002 | Zhang et al. |
| 6,577,678 | B2 * | 6/2003 | Scheuermann ............... 375/222 |
| 7,529,559 | B2 * | 5/2009 | Yamanaka et al. ......... 455/550.1 |

(Continued)

FOREIGN PATENT DOCUMENTS

EP    1553502 A2    7/2005

(Continued)

OTHER PUBLICATIONS

Arndt, M., et al., "Software radio: the challenges for reconfigurable terminals", *Annales of telecommunications*, 57 (7-8), (Jul. 2002),570-612.

(Continued)

*Primary Examiner* — Anthony Addy
(74) *Attorney, Agent, or Firm* — Schwegman, Lundberg & Woessner, P.A.; Gregory L. Gorrie

(57) ABSTRACT

Embodiments of a system and method for signal processing in a wireless communication device are generally described herein. Other embodiments may be described and claimed. In some embodiments, the wireless communication device comprises a first reconfigurable processing engine for configuration by a processing unit to perform a plurality of baseband processing operations on baseband samples. The processing unit may reconfigure the first reconfigurable processing engine for performing each of the plurality of baseband processing operations after completion of a prior one of the baseband processing operations. A second reconfigurable processing engine for configuration by the processing unit may perform decoding operations on output data generated by the first reconfigurable processing engine.

14 Claims, 5 Drawing Sheets

U.S. PATENT DOCUMENTS

| | | | |
|---|---|---|---|
| 7,603,613 B2 * | 10/2009 | Pisek et al. | 714/795 |
| 7,769,912 B2 * | 8/2010 | Pisek et al. | 710/8 |
| 7,822,109 B2 * | 10/2010 | Scheuermann | 375/222 |
| 2002/0119803 A1 * | 8/2002 | Bitterlich et al. | 455/552 |
| 2005/0152322 A1 * | 7/2005 | Dolwin et al. | 370/338 |
| 2008/0051129 A1 * | 2/2008 | Abe et al. | 455/550.1 |
| 2008/0317113 A1 * | 12/2008 | Al Adnani | 375/240 |
| 2010/0080314 A9 * | 4/2010 | van Rooyen | 375/267 |

FOREIGN PATENT DOCUMENTS

| | | |
|---|---|---|
| JP | 2002517121 | 6/2002 |
| WO | WO-9962194 A1 | 12/1999 |
| WO | WO-2007/024153 A1 | 3/2007 |

OTHER PUBLICATIONS

Bapty, T., et al., "Model-Integrated Tools for the Design of Dynamically Reconfigurable Systems", *VLSI Design*, 10(3), (2000),281-306.

Ebeling, C., et al., "Implementing an OFDM Receiver on the RaPiD Configurable Architecture", *IEEE Transactions on Computers*, 53(11), (Nov. 2004),1436-1448.

Heysters, P. M., et al., "Implementation of HiperLAN/2 Receiver on the Reconfigurable Montium Architecture", *Proceedings 18th Int'l Parallel and distributed processing symposium*, (2004),147.

Liu, Z., et al., "Implementation and Evaluation of an OFDM-Based MIMO System", *Signals, Systems and Computers*, (Nov. 7, 2004),545-548.

Mehta, M., et al., "Adaptive Baseband Sub-System for Trust", *IEEE*, (Sep. 18, 200),29-33.

Pan, C., et al., "Design and Analysis of a programmable single-chip architecture for DVB-T base-band receiver", *Design, Automation and Test in Europe Conference and Exhibition*, (Mar. 3, 2003),468-473.

Coulton, P., et al., "AN SDR inspired design for the FPGA implementation of 802.11a baseband system", *Consumer Electronics*, International Symposium on Reading,(Sep. 1, 2004),470-475.

Tuttlebee, W H., *Software Defined Radio: Baseband Technologies for 3G Handsets and Basestations—Chapter 11: Reconfigurable Parallel DSP-rDSP*, (2004).

Zhang, N., et al., "Architectural evaluation of flexible digital signal processing for wireless receivers", *Signals, Systems and Computers*, 1. Conference record of the thirty-fourth Asilomar conference, (Oct. 29, 2000)78-83.

Korean Application Serial No. 10-2008-7004221, Office Action mailed Mar. 31, 2009, 22 pgs.

"Taiwan Application Serial No. 95130634; Office Action Response Filed Jul. 6, 2010", 65 pgs.

"Japanese Application Serial No. 2008-527867, Office Action mailed Jun. 15, 2010", 2 pgs.

"Chinese Application Serial No. 200580051363.7, Office Action mailed Jul. 13, 2010", 5 pgs.

"China Application Serial No. 200580051363.7, Office action mailed May 15, 2009", 4 pgs.

"Taiwan Application serial No. 95130634, Office action mailed Mar. 26, 2010", 12 pgs.

"China Application Serial No. 200580051363.7, Office Action mailed May 15, 2009", 11 pgs.

\* cited by examiner

US 8,095,173 B2

WIRELESS COMMUNICATION DEVICE WITH PHYSICAL-LAYER RECONFIGURABLE PROCESSING ENGINES

RELATED APPLICATIONS

This application is a U.S. National Stage Filing under 35 U.S.C. 371 from International Patent Application No. PCT/RU2005/000429, filed on Aug. 22, 2005, and published in English as WO 2007/024153 on Mar. 1, 2007, which is incorporated herein by reference in its entirety.

TECHNICAL FIELD

Some embodiments of the present invention pertain to wireless communications. Some embodiments pertain to multicarrier communication systems, such as systems that communicate with orthogonal frequency division multiplexed (OFDM) signals. Some embodiments pertain to wireless networks.

BACKGROUND

Wireless communication networks are continually evolving. Older wireless communication devices are many times unable to support newer protocols making them obsolete rather quickly. Furthermore, the inflexible hardware configurations of many conventional wireless communication devices make it difficult for such devices to efficiently run a variety of complex processes. Thus, there are general needs for wireless communication devices with flexible processing architectures.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1A:
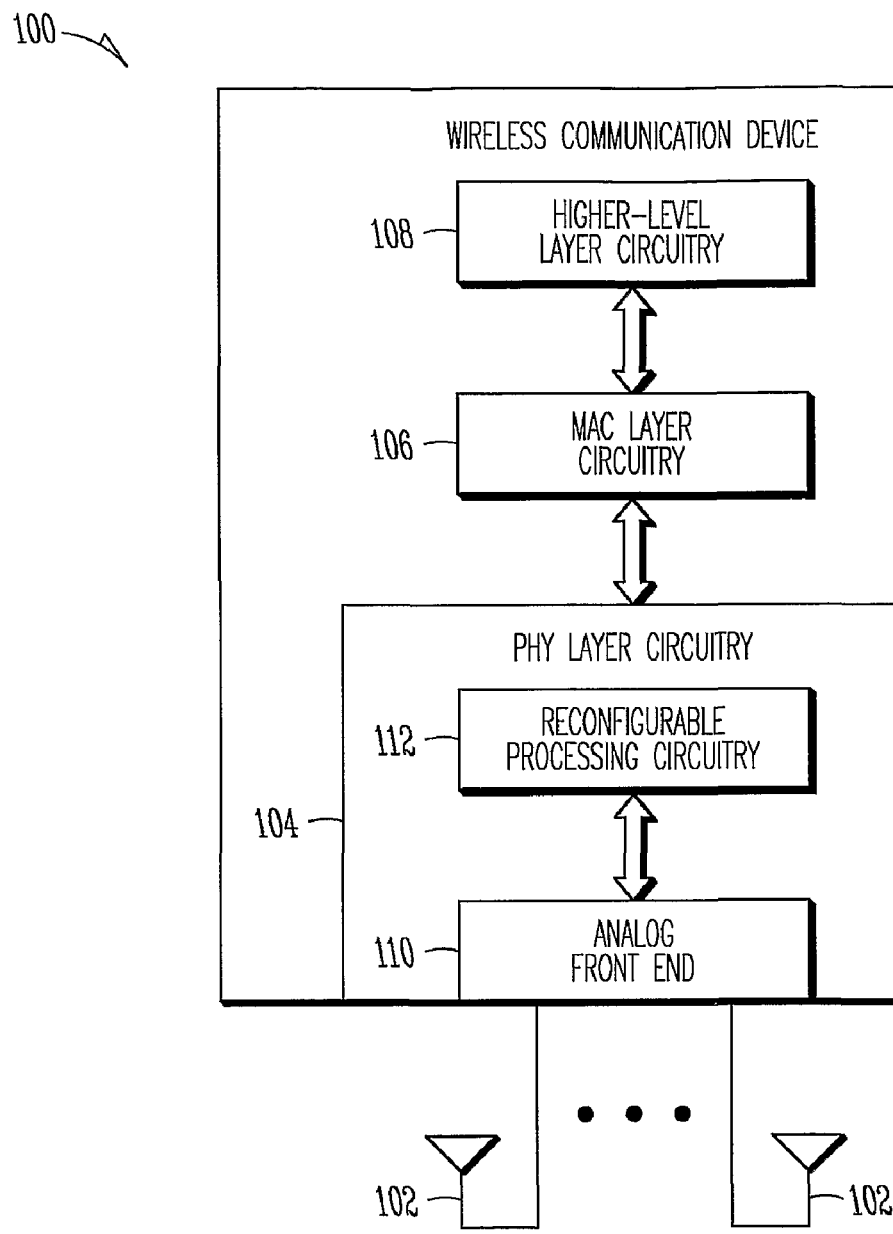
FIG. 1A illustrates a wireless communication device in accordance with some embodiments of the present invention.

FIG. 1A illustrates a wireless communication device in accordance with some embodiments of the present invention. Wireless communication device 100 may transmit and/or receive wireless communication signals with one or more other wireless communication devices. Wireless communication device 100 may include one or more antennas 102, physical (PHY) layer circuitry 104, media-access control (MAC) layer circuitry 106, and higher-level layer circuitry 108. Physical layer circuitry 104 may include analog front-end circuitry 110 and reconfigurable processing circuitry 112.

In some embodiments, during receiving operations, wireless communication device 100 may receive radio-frequency (RF) signals through one or more of antennas 102, and analog front-end circuitry 110 may convert the received RF signals to analog baseband signals. Reconfigurable processing circuitry 112 may process the analog baseband signals to generate decoded bits of decoded MAC frames for MAC layer circuitry 106 which may generate application layer data for higher-level layer circuitry 108. The operations of reconfigurable processing circuitry 112 are discussed in more detail below.

In some embodiments, during transmitting operations, MAC layer circuitry 106 may provide un-encoded bits of MAC frames to reconfigurable processing circuitry 112 of physical layer circuitry 104. Reconfigurable processing circuitry 112 may process the un-encoded bits of MAC frames and generate baseband signals for analog front-end circuitry 110, which may generate RF signals for transmission by antennas 102. The operations of reconfigurable processing circuitry 112 are discussed in more detail below.

Figure 1B:
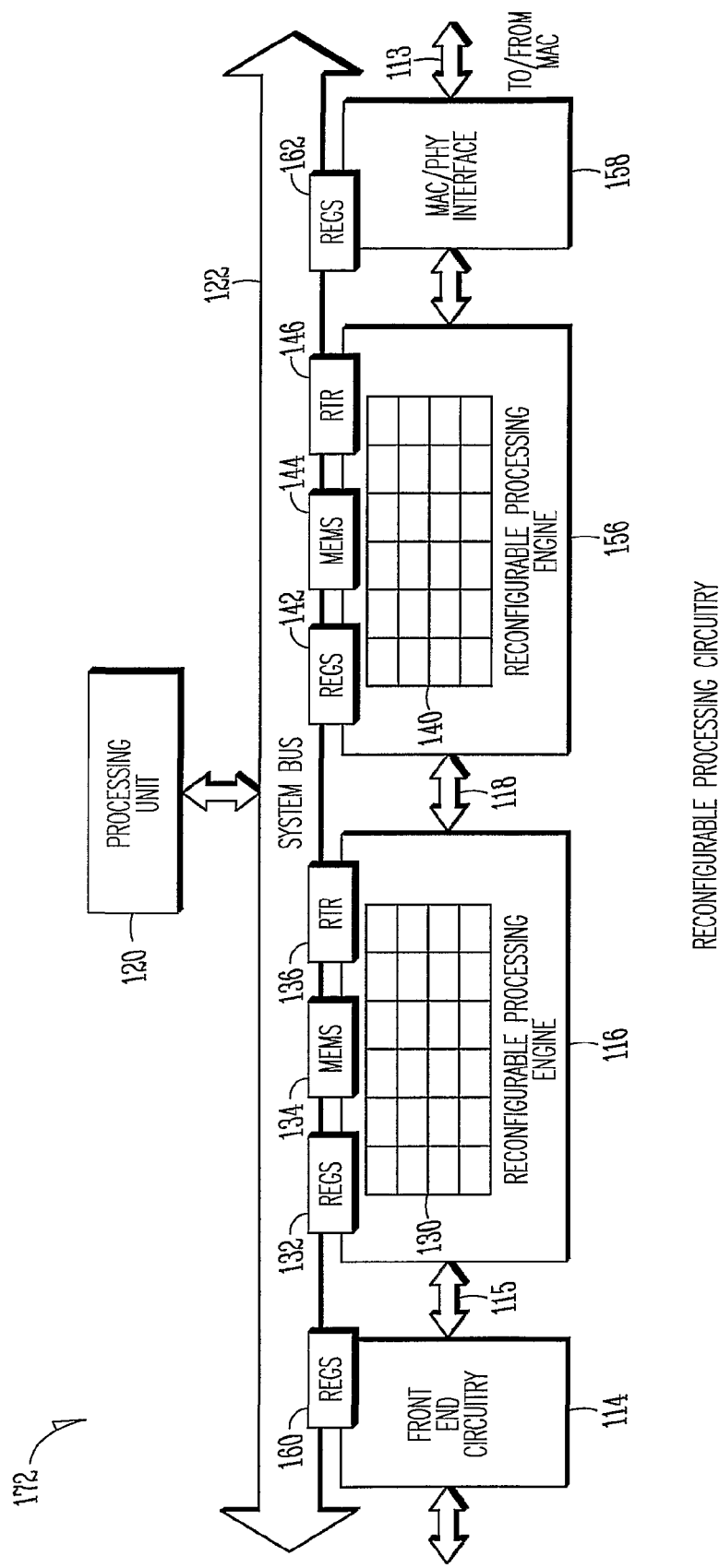
FIG. 1B illustrates reconfigurable processing circuitry of a wireless communication device in accordance with some embodiments of the present invention.

FIG. 1B illustrates reconfigurable processing circuitry of a wireless communication device in accordance with some embodiments of the present invention. In some embodiments, reconfigurable processing circuitry 172 may represent a part of a physical layer of a wireless communication device and may represent only a portion of the processing circuitry of a wireless communication device. Processing circuitry 172 may correspond to reconfigurable processing circuitry 112 (FIG. 1A) and may be suitable for use in a wireless communication device, such as wireless communication device 100 (FIG. 1A). In some embodiments, processing circuitry 172 may be configured to process received signals and may be part of a receiver, while in other embodiments, processing circuitry 172 may be configured to generate signals for transmission and may be part of a transmitter. In some embodiments, processing circuitry 172 may be reconfigured on-the-fly to perform either receiving operations or transmitting operations allowing processing circuitry 172 to function in either a receiving or transmitting mode. In these embodiments, different front-end circuitry may be used for transmitting and receiving. From the receiving perspective, processing circuitry 172 generates decoded data 113 from baseband samples 115 generated from receipt of radio-frequency (RF) signals. From a transmitting perspective, processing circuitry 172 generates baseband samples 115 for RF transmission from data 113.

In accordance with some embodiments of the present invention, processing circuitry 172 may include processing unit 120 and two or more reconfigurable processing engines 116 and 156. The two or more reconfigurable processing engines 116 and 156 may communicate with processing unit 120 over system bus 122. Data, in the form of soft-bit vectors for example, may be transferred between reconfigurable processing engines 116 and 156 over high-speed data path 118.

Reconfigurable processing engine 116 may include registers (REGS) 132 coupled with system bus 122, memories (MEMS) 134 coupled with system bus 122 and run-time reconfigurator (RTR) 136 coupled with systems bus 122. Reconfigurable processing engine 116 may also include reconfigurable interconnect network 130, which may be configured and reconfigured by run-time reconfigurator 136 and may allow registers 132 and memories 134 to be coupled with a plurality of functional units, discussed in more detail below. Reconfigurable interconnect network 130 may also couple with high-speed data path 118 allowing data to be transferred to and from reconfigurable processing engine 156 without interference from processing unit 120 and without the use of system bus 122. In some embodiments, reconfigurable processing engine 116 may be a reconfigurable baseband processing engine for processing orthogonal frequency division multiplexed (OFDM) signals, although the scope of the invention is not limited in this respect.

Reconfigurable processing engine 156 may include registers (REGS) 142 coupled with system bus 122, memories (MEMS) 144 coupled with system bus 122, and run-time reconfigurator (RTR) 146 coupled with systems bus 122. Reconfigurable processing engine 156 may also include reconfigurable interconnect network 140, which may be configured and reconfigured by run-time reconfigurator 146 and may allow registers 142 and memories 144 to be coupled with a plurality of functional units. Reconfigurable interconnect network 140 may also couple with high-speed data path 118 allowing data to be transferred to and from reconfigurable processing engine 116 without interference from processing unit 120 and without the use of system bus 122. In some embodiments, reconfigurable processing engine 156 may be a decoding processing engine and may perform Viterbi, low-density parity check (LDPC), Turbo, and/or Reed Solomon forward-error correcting (FEC), although the scope of the invention is not limited in this respect.

In some embodiments, reconfigurable interconnect networks 130 and 140 may comprise field-programmable gate-array (FPGA) circuitry, although the scope of the invention is not limited in this respect. In some embodiments, processing unit 120 may be a microprocessor or central processing unit (CPU), although the scope of the invention is not limited in this respect. In some embodiments, processing unit 120 may be a managing processing element of wireless communication device 100 (FIG. 1A).

In some embodiments, processing unit 120 may perform high-latency operations and may reconfigure reconfigurable processing engines 116 and 156 with run-time reconfigurators 136 and 146. Processing unit 120 may control reconfigurable processing engines 116 and 156 via state registers, such as registers 132 and 142. In some embodiments, reconfigurable processing engine 116 may perform low-latency operations on complex baseband signals 115. The low-latency operations may include, for example, signal detection, frequency correction and Fourier transform operations, although the scope of the invention is not limited in this respect. The performance of the low-latency operations by reconfigurable processing engine 116 may generate soft-bit vectors. In some embodiments, reconfigurable processing engine 116 may be reconfigured by processing unit 120 for separately and sequentially performing each of the low-latency operations. An example of this is described in more detail below.

In some embodiments, reconfigurable processing engine 156 may be configured to perform decoding operations on the soft-bit vectors generated by reconfigurable processing engine 116. The soft-bit vectors may be received from reconfigurable processing engine 116 over high-speed data path 118 which may be inaccessible by processing unit 120.

In some embodiments, complex baseband signals 115 may be generated from received OFDM signals. In some embodiments, processing circuitry 172 may allow a high degree of hardware reuse and re-programming for different and/or future communication protocols. In some embodiments, reconfigurable processing engines 116 and 156 may be heterogeneous on-the-fly reconfigurable processing engines. In some embodiments, processing unit 120 may configure reconfigurable processing engine 156 to perform decoding operations, which may comprise Viterbi decoding operations, Turbo-decoding operations, Reed-Solomon decoding operations, or LDPC decoding operations, although other decoding operations may also be performed.

In some embodiments, the operations performed by reconfigurable processing engines 116 and 156 may be pipelined allowing for fast computations. In some embodiments, processing unit 120 may track the operations performed by reconfigurable processing engines 116 and 156 by status registers, such as registers 132 and 142, and memories, such as memories 134 and 144, coupled with system bus 122. In some embodiments, reconfigurable processing engines 116 and 156 may allow partial reconfigurations to help reduce reconfiguration time. In some embodiments, interconnect networks 130 and 140 within reconfigurable processing engines 116 and 156, respectively, may be partially connected to reduce die size and power consumption (i.e., unused connections may be exclude from the interconnect network to reduce power consumption).

In some embodiments, after each operation when a processing engine configuration remains fixed, the engine may raise a corresponding assigned interrupt request (IRQ), which may force processing unit 120 to decide which operation to perform next, although the scope of the invention is not limited in this respect.

In some embodiments, each of reconfigurable processing engines 116 and 156 may have logic elements configured and suited to perform certain tasks, such as baseband processing operations on OFDM signals, or decoding operations on soft-bit vectors, although the scope of the invention is not limited in this respect.

Although processing circuitry 172 is illustrated as including reconfigurable processing engine 156, in some embodiments, reconfigurable processing engine 156 may be replaced with non-reconfigurable logic circuitry when, for example, only predetermined decoding operations need to be performed.

In some embodiments, wireless communication device 100 (FIG. 1A) may transmit and/or receive multicarrier communication signals, such as OFDM communication signals. In some embodiments, wireless communication device 100 (FIG. 1A) may communicate over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers, although the scope of the invention is not limited in this respect. To help achieve orthogonality between the closely spaced subcarriers, each subcarrier may have a null at substantially a center frequency of the other subcarriers. In some embodiments, to help achieve orthogonality between the closely spaced subcarriers, each subcarrier may have an integer number of cycles within a symbol period, although the scope of the invention is not limited in this respect. In some other embodiments, wireless communication device 100 (FIG. 1A) may transmit and receive spread-spectrum signals, although the scope of the invention is not limited in this respect.

In some embodiments, wireless communication device 100 (FIG. 1A) may be a wireless access point (AP), such as a Wireless Fidelity (WiFi), Worldwide Interoperability for Microwave Access (WiMax), or broadband communication station, although the scope of the invention is not limited in this respect as wireless communication device 100 (FIG. 1A) may be almost any wireless communication device. In some embodiments, the frequency spectrums for multicarrier communication signals communicated by wireless communication device 100 (FIG. 1A) may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, wireless communication device 100 (FIG. 1A) may transmit and/or receive radio-frequency (RF) communications in accordance with specific communication standards, such as the Institute of Electrical and Electronics Engineers (IEEE) standards including IEEE 802.11 (a), 802.11(b), 802.11(g), 802.11(h) and/or 802.11(n) standards for wireless local area networks (WLANs), although wireless communication device 100 (FIG. 1A) may also be suitable to transmit and/or receive communications in accordance with other techniques including the Digital Video Broadcasting Terrestrial (DVB-T) broadcasting standard, and the High performance radio Local Area Network (HiperLAN) standard. In some broadband and WiMax embodiments, wireless communication device 100 (FIG. 1A) may transmit broadband wireless communications in accordance with the IEEE 802.16(e) standards for wireless metropolitan area networks (WMANs). For more information with respect to IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

In some embodiments, wireless communication device 100 (FIG. 1A) may be part of a portable wireless communication device, such as personal digital assistant (PDA), a laptop or portable computer with wireless communication capability, a web tablet, a wireless telephone, a wireless headset, a pager, an instant messaging device, a digital camera, an access point, a television or other device that may receive and/or transmit information wirelessly.

Antennas 102 (FIG. 1A) may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a signal antenna with multiple apertures may be used. In some embodiments which employ antenna diversity, such as multiple-input multiple output (MIMO) embodiments, two or more of antennas 102 (FIG. 1A) may be used for communicating two or more data streams. In some other embodiments, a single antenna may be used for communicating. Although only one set of antennas 102 (FIG. 1A) are illustrated, in some embodiments, separate analog front-end circuitry and associated antennas may be used for transmitting and receiving.

Figure 2:
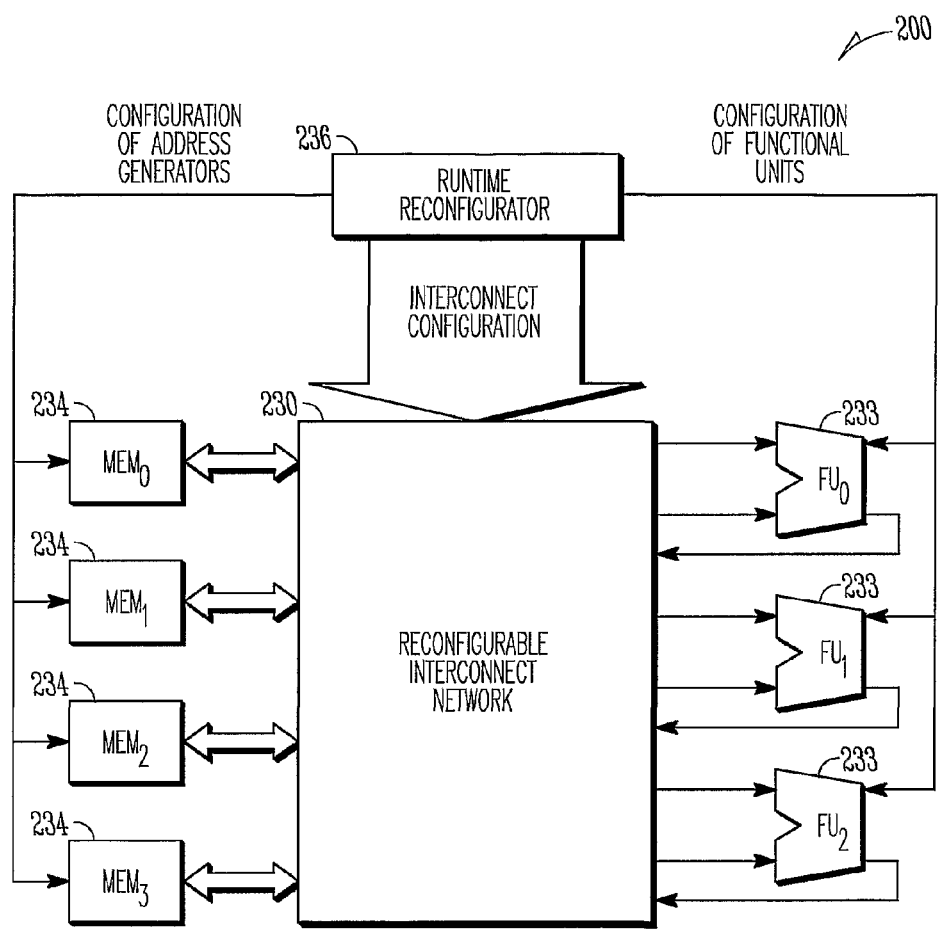
FIG. 2 illustrates a block diagram of a reconfigurable processing engine in accordance with some embodiments of the present invention.

FIG. 2 illustrates a block diagram of a reconfigurable processing engine in accordance with some embodiments of the present invention. Reconfigurable processing engine 200 may correspond to reconfigurable processing engine 116 (FIG. 1B) and/or reconfigurable processing engine 156 (FIG. 1B).

In the embodiments illustrated in FIG. 2, reconfigurable processing engine 200 may be configured for performing various baseband processing operations, such as the baseband processing operations that may be performed by reconfigurable processing engine 116 (FIG. 1B), although the scope of the invention is not limited in this respect. In these embodiments, reconfigurable processing engine 200 comprises a set of memories 234 for storing intermediate data or buffering samples. Memories 234 may, for example, correspond to memories 134 (FIG. 1B). The intermediate data may be received from a decoding engine, such a reconfigurable processing engine 156 (FIG. 1B) when operating in a transmitting mode. When operating in a receiving mode, samples may be received from digital front end circuitry 114 (FIG. 1B).

Reconfigurable processing engine 200 may also include functional units (FUs) 233, which may comprise summers, multipliers, barrel shifters, lookup tables, as well as other functional elements. Although only three functional units 233 are illustrated, reconfigurable processing engine 200 may include additional or fewer functional units. Reconfigurable processing engine 200 may also include reconfigurable interconnect network 230, which may correspond to reconfigurable interconnect network 130 (FIG. 1B). In these embodiments, memories and state registers of functional units 233 in engine 200 may be accessible to processing unit 120 (FIG. 1B) to perform control of signal processing.

Reconfigurable processing engine 200 may also include run-time reconfigurator 236, which may correspond to run-time reconfigurator 136 (FIG. 1B). Run-time reconfigurator 236 may provide a configuration of address generators for memories 234, a configuration for functional units 233, and an interconnect configuration for reconfigurable interconnect network 230, although the scope of the invention is not limited in this respect.

In some embodiments, reconfigurable processing engine 156 (FIG. 1B) may have a similar structure to reconfigurable processing engine 200, however the logic elements and memories may be specially configured for decoding and may differ from those of reconfigurable processing engine 116 (FIG. 1B). In some embodiments, reconfigurable processing engine 156 (FIG. 1B) may be heterogeneous engines, although the scope of the invention is not limited in this respect. In some embodiments, for the support of LDPC decoding, memories of reconfigurable processing engine 156 (FIG. 1B) may be enhanced with logic (e.g., associative memories) in order to help minimize data transfer, although the scope of the invention is not limited in this respect.

Although wireless communication device 100 (FIG. 1A), reconfigurable processing circuitry 172 (FIG. 1B), and reconfigurable processing engine 200 (FIG. 2) are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements may refer to one or more processes operating on one or more processing elements.

In some embodiments, the reconfiguration instructions received from processing unit 120 (FIG. 1B) may comprise instructions to change connections within reconfigurable interconnect network 130 and to change at least some functions performed by the functional units. In some embodiments, the instructions may include instructions to upload an address table by the address generators. For example, in some embodiments, the functionality of one or more of functional units 233 (FIG. 2) may be changed to perform a summation from a subtraction based on the reconfiguration instructions, although the scope of the invention is not limited in this respect. In some embodiments, processing unit 120 (FIG. 1B) may send configuration instructions to configure and/or reconfigure each reconfigurable processing engine over the system bus 122 (FIG. 1B).

In some embodiments, processing unit 120 (FIG. 1B) may configure first and second reconfigurable processing engines 116 and 156 (FIG. 1B) to perform, respectively, baseband processing operations and decoding operations for processing received orthogonal frequency division multiplexed signals. Processing unit 120 (FIG. 1B) may further reconfigure first and second reconfigurable processing engines 116 and 156 (FIG. 1B) to perform, respectively, baseband processing operations and encoding operations for generating OFDM signals for transmission.

Figure 3:
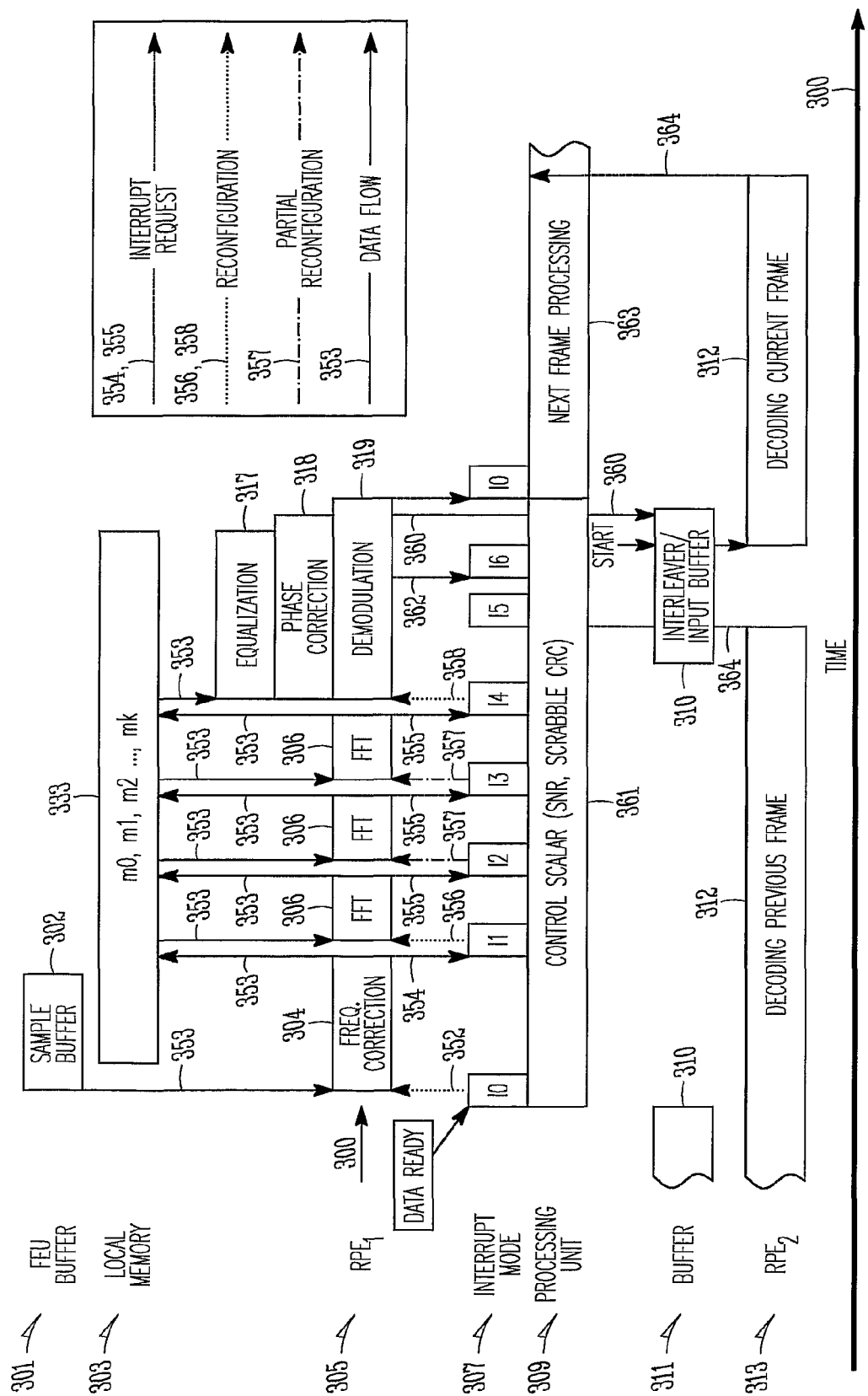
FIG. 3 is a time-line illustrating operations performed by reconfigurable processing circuitry of a wireless communication device in accordance with some embodiments of the present invention.

FIG. 3 is a time-line illustrating operations performed by reconfigurable processing circuitry of a wireless communication device accordance with some embodiments of the present invention. In some embodiments, some operations shown in time line 300 are performed for one OFDM symbol, although the scope of the invention is not limited in this respect. Time line 300 illustrates some of the operations performed when processing circuitry 172 (FIG. 1B) operates in a receive-mode and processes baseband samples generated from received RF signals to generate decoded bits 113 (FIG. 1B) for MAC layer circuitry 106 (FIG. 1A). Similar operations may be performed in the reverse order for generating signals for transmission in a transmit-mode, although the scope of the invention is not limited in this respect.

Operations of line 301 illustrate the storage of baseband samples in a sample buffer of front-end circuitry 114 (FIG. 1B), which may be referred to as a front-end unit (FEU) buffer, although the scope of the invention is not limited in this respect. The sample buffer may correspond to registers 160 (FIG. 1B). Operations of line 303 illustrate the storage of data in local memories 333 of reconfigurable processing engine 116 (FIG. 1B) and may correspond to memories 134 (FIG. 1B) and/or registers 132 (FIG. 1B). Operations of line 305 illustrate the operations performed by reconfigurable processing engine 116 (FIG. 1B) (RPE$_1$) when configured to perform baseband processing operations.

Operations of line 307 illustrate when processing unit 120 (FIG. 1B) operates in an interrupt mode. Operations of line 309 illustrate operations 361 for a current symbol and operations 363 for a next symbol performed by processing unit 120 (FIG. 1B). Operations of line 311 illustrate the storage of data in an input buffer of reconfigurable processing engine 156 (FIG. 1B) and may correspond to memories 144 (FIG. 1B) and registers 142 (FIG. 1B). Operations of line 313 illustrate the operations performed by reconfigurable processing engine 156 (FIG. 1B) (RPE$_2$) when performing decoding operations.

Figure 4:
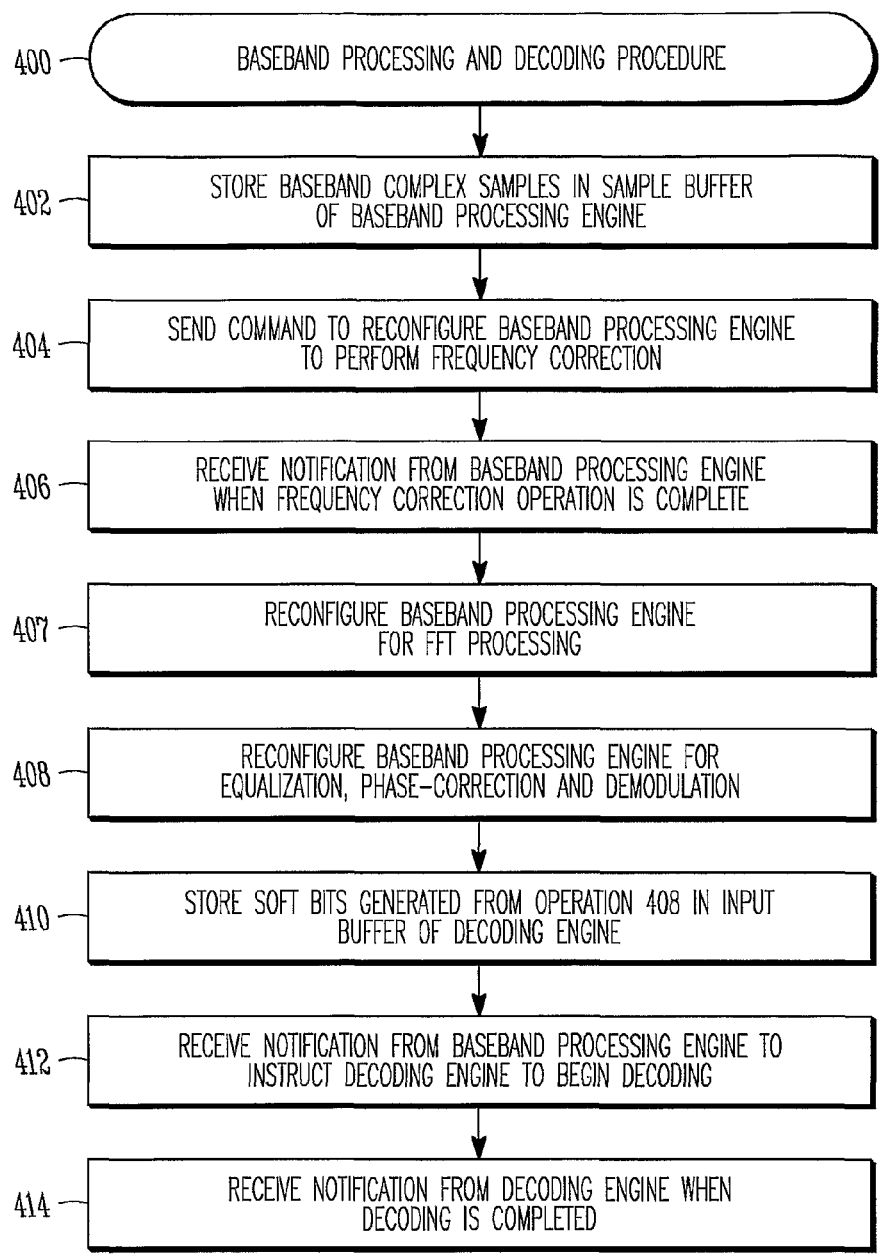
FIG. 4 is a flow chart of processing procedure in accordance with some embodiments of the present invention.

FIG. 4 is a flow chart of processing procedure in accordance with some embodiments of the present invention. In some embodiments, procedure 400 may be performed by reconfigurable processing circuitry 172 (FIG. 1B) to process baseband samples and generate a decoded bit stream for MAC layer 106 (FIG. 1A), although the scope of the invention is not limited in this respect. In some embodiments, procedure 400 may be performed by wireless communication device 100 (FIG. 1A) to generate decoded MAC frames from baseband samples 115 (FIG. 1B).

In operation 402, complex baseband samples (i.e., in-phase (I) and quadrature-phase (Q) samples) may be stored in a sample buffer of a reconfigurable processing engine. In some embodiments, complex baseband samples 115 (FIG. 1B) from front-end circuitry 114 (FIG. 1B) may be stored in sample buffer 302 (FIG. 3) associated with in reconfigurable processing engine 116. Sample buffer 302 (FIG. 3) may correspond to registers 160 (FIG. 1B) of front-end circuitry 114 (FIG. 1B). In some embodiments, sample buffer 302 (FIG. 3) may be a referred to as a front-end unit (FEU) buffer, although the scope of the invention is not limited in this respect.

In operation 404, processing unit 120 (FIG. 1B) may send a command to reconfigure reconfigurable processing engine 116 (FIG. 1B) to perform frequency correction. For example, when enough baseband samples are stored from operation 402, processing unit 120 (FIG. 1B) sends configuration instructions 353 (FIG. 3) to run-time reconfigurator 136 (FIG. 1B) of reconfigurable processing engine 116 (FIG. 1B) which may force a reconfiguration of reconfigurable processing engine 116 (FIG. 1B) for frequency correction operations 304 (FIG. 3). In some embodiments, the configuration pattern may be stored in a memory associated with processing unit 120 (FIG. 1B), or in a configuration cache inside reconfigurable processing engine 116 (FIG. 1B) allowing for a fast configuration switch.

Operation 406 comprises receiving notification from reconfigurable processing engine 116 (FIG. 1B) when frequency correction operations 304 (FIG. 3) are complete. In some embodiments, when frequency correction operations 304 (FIG. 3) are finished, reconfigurable processing engine 116 (FIG. 1B) may raise IRQ 354 (FIG. 3), which may be a special assigned interrupt request of processing unit 120 (FIG. 1B).

Operation 407 comprises reconfiguring reconfigurable processing engine 116 (FIG. 1B) for Fourier transformation operations 306 (FIG. 3), such as fast Fourier transform (FFT) operations. In operation 407, processing unit 120 (FIG. 1B) sends next configuration command 356 (FIG. 3) to reconfigurable processing engine 116 (FIG. 1B) in accordance with the program running. In the example shown in FIG. 3, this configuration may correspond to the first stage of radix-4 FFT (e.g., a 64 point FFT). In some embodiments, three stages of FFT operations 306 (FIG. 3) may be performed, although the scope of the invention is not limited in this respect. In some embodiments, after the completion of each FFT stage, a partial reconfiguration may be initiated by processing unit 120 (FIG. 1B) by providing partial reconfiguration instructions or commands 357 (FIG. 3) to reconfigurable processing engine 116 (FIG. 1B). After completion of each FFT stage, reconfigurable processing engine 116 (FIG. 1B) may generate interrupt requests 355 (FIG. 3) to processing unit 120 (FIG. 1B). Data flow 353 (FIG. 3) may occur between local memory 333 (FIG. 3) and reconfigurable processing engine 116 (FIG. 1B) during these operations.

Operation 408 comprises reconfiguring reconfigurable processing engine 116 (FIG. 1B) for performing equalization operation 317 (FIG. 3), phase correction operation 318 (FIG. 3) and/or demodulation operation 319 (FIG. 3) by providing command 358. In the example illustrated in FIG. 3, after finishing the third stage of FFT operations, processing unit 120 (FIG. 1B) may begin operating a corresponding IRQ handler which may configure reconfigurable processing engine 116 (FIG. 1B) for performing a next operation. In some embodiments, the next operations may comprise equalization, phase correction and/or demodulation operations, which may be soft bit calculations, although the scope of the invention is not limited in this respect. The data used for these operations may be stored in local memories 134 (FIG. 1B) of reconfigurable processing engine 116 (FIG. 1B).

Operation 410 comprises storing the soft bits generated in operation 408 in an input buffer of a second reconfigurable processing engine, such as reconfigurable processing engine 156 (FIG. 1B). In some embodiments, calculated soft bits 360 (FIG. 3) from operation 408 may be supplied to input buffer 310 (FIG. 3) of reconfigurable processing engine 156 (FIG. 1B). In some embodiments, input buffer 310 (FIG. 3) may be represented by a memory block with an address generator allowing the interleaving of bit sequences according to the protocol used. For example, a block interleaving process may be performed in which bit sequences are input to input buffer 310 (FIG. 3) in a row-by-row fashion, and read out of input buffer 310 (FIG. 3) in a column-by-column fashion, although the scope of the invention is not limited in this respect.

Operation 412 comprises receiving notification from reconfigurable processing engine 116 (FIG. 1B) instructing reconfigurable processing engine 156 (FIG. 1B) to begin decoding operations 312 (FIG. 3). Operation 412 may be performed when enough data is processed in reconfigurable processing engine 116 (FIG. 1B). In some embodiments, baseband processing engine 116 may raise IRQ 362 (FIG. 3) (shown as 16) to initiate the start of the decoding process of operations 312 (FIG. 3).

Operation 414 comprises receiving notification from reconfigurable processing engine 156 (FIG. 1B) when decoding operations 312 (FIG. 3) are complete. In some embodiments, after finishing decoding, reconfigurable processing engine 156 (FIG. 1B) may raise interrupt request 364 (FIG. 3) (shown as IRQ I5) to inform processing unit 120 (FIG. 1B) that the frame decoding has finished. In the example illustrated in FIG. 3, there may be no need for re-configuring reconfigurable processing engine 156 (FIG. 1B) because reconfigurable processing engine 156 (FIG. 1B) may not need to be reconfigured to decode a next block of bits from reconfigurable processing engine 116 (FIG. 1B). In some embodiments, the decoded data may be stored in an input buffer of MAC/PHY interface 158 (FIG. 1B), such as registers (REGS) 162 (FIG. 1B).

In some alternate embodiments, reconfigurable processing engine 156 (FIG. 1B) may be reconfigured in the same or similar way as reconfigurable processing engine 116 (FIG. 1B) when, for instance, a switch between decoders and puncturing schemes is initiated. In some embodiments, reconfigurable processing engine 156 (FIG. 1B) may be reconfigured when, for example, a switch between encoding and decoding operations is required, such as when processing circuitry 172 (FIG. 1B) switches between transmitting and receiving operations.

Although the individual operations of procedure 400 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof.

Some embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:
1. A wireless communication device comprising:
   a first reconfigurable processing engine for configuration by a processing unit to perform a plurality of baseband processing operations on baseband samples, the processing unit to reconfigure the first reconfigurable processing engine for performing each of the plurality of baseband processing operations after completion of a prior one of the baseband processing operations; and
   a second reconfigurable processing engine for configuration by the processing unit to perform decoding operations on output data generated by the first reconfigurable processing engine;
   a high-speed data path inaccessible by the processing unit and coupling the first and second reconfigurable processing engines; and
   a system bus coupling the processing unit and the first and second reconfigurable processing engines for reconfiguring the first and second reconfigurable processing engines,
   wherein output data generated by the first reconfigurable processing engine is provided to the second reconfigurable processing engine over the high-speed data path,
   wherein the plurality of baseband processing operations comprise at least one of frequency correction operations, Fourier transform operations and demodulation operations, and wherein the wireless communication device further comprises a sample buffer to store the baseband samples, wherein the processing unit is configured to configure the first reconfigurable processing engine to perform frequency correction operations when a predetermined number of baseband samples are stored in the sample buffer, wherein after the frequency corrections operations are complete, the processing unit is configured to configure the first reconfigurable processing engine to perform fast Fourier transform (FFT) operations; and wherein after the FFT operations are complete, the processing unit is configured to configure the first reconfigurable processing engine to perform equalization, phase correction and demodulation operations concurrently.

2. The wireless communication device of claim 1 wherein the demodulation operation includes storing soft bits in an input buffer of the second reconfigurable processing engine, wherein the first reconfigurable processing engine is configured to instruct the second reconfigurable processing engine upon completion of the demodulation operation, and the processing unit is configured to instruct the second reconfigurable processing engine to begin frame decoding operations, wherein the second reconfigurable processing engine is configured to perform frame decoding operations on a current frame while the first reconfigurable processing engine performs operations on a next frame.

3. The wireless communication device of claim 2 wherein the first reconfigurable processing engine writes the soft bits to the input buffer and the second reconfigurable processing engine reads the soft bits from the input buffer to perform a block interleaving operation on the soft bits.

4. The wireless communication device of claim 1 wherein the FFT operations comprise a plurality of stages of FFT operations, wherein after each stage of FFT operations, the processing unit is configured to at least partially reconfigure the first reconfigurable processing engine to perform a next stage of FFT operations until a final stage of FFT operations is performed.

5. A wireless communication device comprising:

a first reconfigurable processing engine for configuration by a processing unit to perform a plurality of baseband processing operations on baseband samples, the processing unit to reconfigure the first reconfigurable processing engine for performing each of the plurality of baseband processing operations after completion of a prior one of the baseband processing operations; and a second reconfigurable processing engine for configuration by the processing unit to perform decoding operations on output data generated by the first reconfigurable processing engine;

a high-speed data path inaccessible by the processing unit and coupling the first and second reconfigurable processing engines; and a system bus coupling the processing unit and the first and second reconfigurable processing engines for reconfiguring the first and second reconfigurable processing engines, wherein output data generated by the first reconfigurable processing engine is provided to the second reconfigurable processing engine over the high-speed data path, wherein the first and second reconfigurable processing engines each comprise memory, address generators, functional units, a reconfigurable interconnect network, and a run-time reconfigurator, wherein the reconfiguration instructions received from the processing unit comprise instructions to change connections within the reconfigurable interconnect network and change one or more functions performed by the functional units, wherein the instructions further include instructions to upload an address table by the address generators, wherein the baseband samples are stored in a sample buffer, wherein the processing unit is configured to configure the first reconfigurable processing engine to perform frequency correction operations when a predetermined number of the baseband samples are stored in the sample buffer, wherein after the frequency corrections operations are complete, the processing unit is configured to configure the first reconfigurable processing engine to perform fast Fourier transform (FFT) operations; and wherein after the FFT operations are complete, the processing unit is configured to configure the first reconfigurable processing engine to perform equalization, phase correction and demodulation operations concurrently.

6. A method for signal processing comprising:

configuring a first reconfigurable processing engine by a processing unit to perform a plurality of baseband processing operations on baseband samples, the processing unit to reconfigure the first reconfigurable processing engine for performing each of the baseband processing operations after completion of a prior one of the baseband processing operations;

configuring a second reconfigurable processing engine by the processing unit to perform decoding operations on output data generated by the first reconfigurable processing engine; and communicating the output data over a high-speed data path coupling the first and second reconfigurable processing engines, the high-speed data path being inaccessible to the processing unit, wherein the processing unit reconfigures the first and second reconfigurable processing engines over a system bus, wherein the baseband processing operations comprise at least one of frequency correction operations, Fourier transform operations and demodulation operations, wherein the wireless communication device further comprises a sample buffer to store the baseband samples, wherein the processing unit is configured to configure the first reconfigurable processing engine to perform frequency correction operations when a predetermined number of baseband samples are stored in the sample buffer, wherein after the frequency corrections operations are complete, the processing unit is configured to configure the first reconfigurable processing engine to perform fast Fourier transform (FFT) operations; and wherein after the FFT operations are complete, the processing unit is configured to configure the first reconfigurable processing engine to perform equalization, phase correction and demodulation operations concurrently.

7. The method of claim 6 wherein the baseband processing operations further comprise at least one of equalization operations and phase correction operations the demodulation operation includes storing soft bits in an input buffer of the second reconfigurable processing engine, wherein the first reconfigurable processing engine is configured to instruct the second reconfigurable processing engine upon completion of the demodulation operation, and the processing unit is configured to instruct the second reconfigurable processing engine to begin frame decoding operations, wherein the second reconfigurable processing engine is configured to perform frame decoding operations on a current frame while the first reconfigurable processing engine performs operations on a next frame.

8. The method of claim 7 wherein the first reconfigurable processing engine writes the soft bits to the input buffer and the second reconfigurable processing engine reads the soft bits from the input buffer to perform a block interleaving operation on the soft bits.

9. The method of claim 6 wherein the FFT operations comprise a plurality of stages of FFT operations,
wherein after each stage of FFT operations, the processing unit is configured to at least partially reconfigure the first reconfigurable processing engine to perform a next stage of FFT operations until a final stage of FFT operations is performed.

10. A method for signal processing comprising:
configuring a first reconfigurable processing engine by a processing unit to perform a plurality of baseband processing operations on baseband samples, the processing unit to reconfigure the first reconfigurable processing engine for performing each of the baseband processing operations after completion of a prior one of the baseband processing operations;
configuring a second reconfigurable processing engine by the processing unit to perform decoding operations on output data generated by the first reconfigurable processing engine; and
communicating the output data over a high-speed data path coupling the first and second reconfigurable processing engines, the high-speed data path being inaccessible to the processing unit,
wherein the processing unit reconfigures the first and second reconfigurable processing engines over a system bus,
wherein the first and second reconfigurable processing engines each comprise memory, address generators, functional units, a reconfigurable interconnect network, and a run-time reconfigurator,
wherein the method further comprises receiving the reconfiguration instructions from the processing unit to change connections within the reconfigurable interconnect network, to change one or more functions performed by the functional units, and to upload an address table by the address generators,
wherein the baseband samples are stored in a sample buffer,
wherein the processing unit is configured to configure the first reconfigurable processing engine to perform frequency correction operations when a predetermined number of the baseband samples are stored in the sample buffer,
wherein after the frequency corrections operations are complete, the processing unit is configured to configure the first reconfigurable processing engine to perform fast Fourier transform (FFT) operations; and
wherein after the FFT operations are complete, the processing unit is configured to configure the first reconfigurable processing engine to perform equalization, phase correction and demodulation operations concurrently.

11. Processing circuitry for a wireless communication device comprising:
two or more reconfigurable processing engines; and
a processing unit to perform higher-latency operations and to reconfigure the two or more reconfigurable processing engines with run-time reconfigurators and to control the two or more reconfigurable processing engines via state registers,
wherein a first of the reconfigurable processing engines performs lower-latency operations on complex baseband signals including signal detection, frequency correction and Fourier transform operations to generate soft-bit vectors, the first reconfigurable processing engine being reconfigured by the processing unit for separately performing each of the lower-latency operations, and
wherein a second of the reconfigurable processing engines is configured to perform decoding operations on the soft-bit vectors, the soft-bit vectors being received from the first reconfigurable processing engine over a high-speed data path inaccessible by the processing unit,
wherein the complex baseband signals are generated from received orthogonal frequency division multiplexed signals,
wherein the processing unit configures the second reconfigurable processing engine to perform decoding operations comprising one of Viterbi decoding operations, Turbo-decoding operations, Reed-Solomon decoding operations, or low-density-parity check decoding operations,
wherein the first and second reconfigurable processing engines each comprise memory, address generators, functional units, a reconfigurable interconnect network, and a run-time reconfigurator,
wherein the reconfiguration instructions received from the processing unit comprise instructions to change connections within the reconfigurable interconnect network and to change one or more functions performed by the functional units,
wherein the instructions further including instructions to upload an address table by the address generators,
wherein the complex baseband samples are stored in a sample buffer,
wherein the processing unit is configured to configure the first reconfigurable processing engine to perform frequency correction operations when a predetermined number of the baseband samples are stored in the sample buffer,
wherein after the frequency corrections operations are complete, the processing unit is configured to configure the first reconfigurable processing engine to perform fast Fourier transform (FFT) operations; and
wherein after the FFT operations are complete, the processing unit is configured to configure the first reconfigurable processing engine to perform equalization, phase correction and demodulation operations concurrently.

12. The processing circuitry of claim 11 wherein the FFT operations comprise a plurality of stages of FFT operations, wherein after each stage of FFT operations, the processing unit is configured to at least partially reconfigure the first reconfigurable processing engine to perform a next stage of FFT operations until a final stage of FFT operations is performed.

13. The processing circuitry of claim 11 wherein the demodulation operation includes storing soft bits in an input buffer of the second reconfigurable processing engine,
wherein the first reconfigurable processing engine is configured to instruct the second reconfigurable processing engine upon completion of the demodulation operation, and the processing unit is configured to instruct the second reconfigurable processing engine to begin frame decoding operations,
wherein the second reconfigurable processing engine is configured to perform frame decoding operations on a current frame while the first reconfigurable processing engine performs operations on a next frame.

14. The processing circuitry of claim 13 wherein the first reconfigurable processing engine writes the soft bits to the input buffer and the second reconfigurable processing engine reads the soft bits from the input buffer to perform a block interleaving operation on the soft bits.

* * * * *